April 6, 1937. C. E. KIRK 2,076,465
FLOW BEAN
Filed Nov. 13, 1935
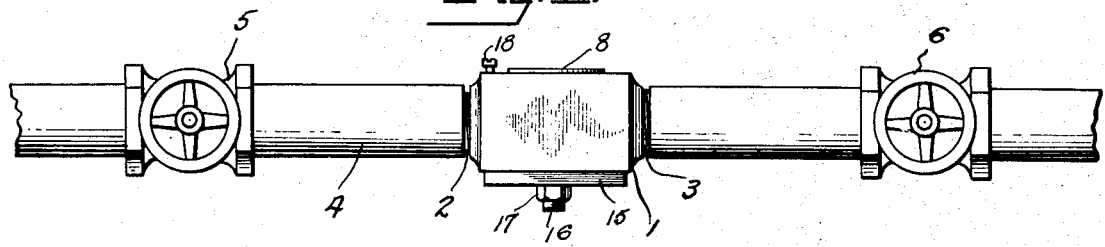
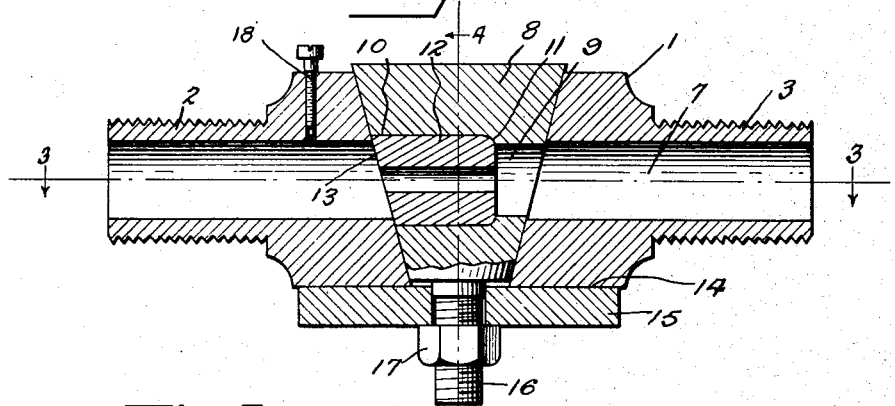
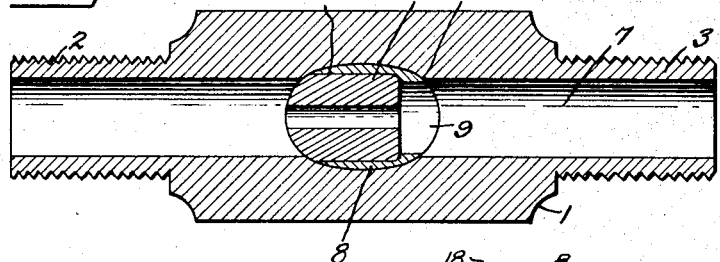
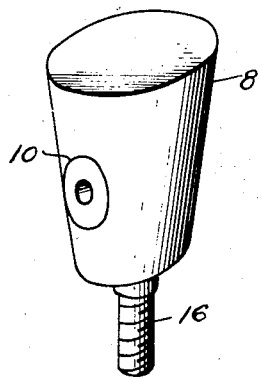
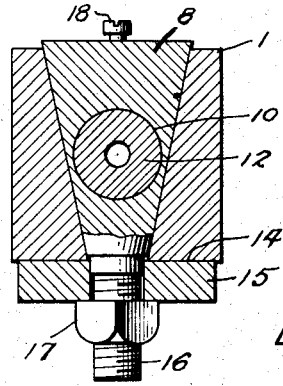
Inventor
C. E. Kirk
By Mason Fenwick & Lawrence
Attorneys Patented Apr. 6, 1937

2,076,465

UNITED STATES PATENT OFFICE 2,076,465

FLOW BEAN

Cecil E. Kirk, Woodsboro, Tex., assignor to Kirk Corporation, Houston, Tex., a corporation of Texas Application November 13, 1935, Serial No. 49,609

2 Claims. (Cl. 138—44)

This invention relates to flow beans for regulating the flow of petroleum, natural gas, or any other fluids, gases or substances flowing or moving through pipes, conduits, etc.

Since the employment of chokes or flow beans is usually associated with situations in which the oil or other fluid to be controlled is under great pressure, difficulty is ordinarily experienced in making the change from one size of orifice to another, resulting in the expenditure of much time and effort, and frequently causing the loss of a considerable amount of the fluid.

The object of the present invention is the provision of a flow bean of simple construction, readily installed and interchanged, and which eliminates largely the danger incident to reducing the size of the choke in any flowing oil or gas well, particularly where the fluid is being moved under high pressure, because it eliminates the necessity of changing the block or body enclosing the core.

Specifically the object of the invention is to provide a choke bean which can be replaced by one of different size by merely lifting out the core, and without disturbing the body in which the core seats.

Another specific object of the invention is the provision of a choke bean so constructed that it cannot possibly become displaced and prevent the removal of the core.

Other objects of the invention will appear as the following description of a preferred and practical embodiment proceeds.

In the drawing which accompanies and forms a part of the following specification, and throughout the several figures of which the same characters or references have been employed to designate identical parts:

Figure 1 is a side elevation of a choke bean assembly intercalated in a conduit between two cut-off valves;

Figure 2 is a vertical longitudinal section through the choke assembly;

Figure 3 is a horizontal section taken along the line 3—3 of Figure 2;

Figure 4 is a vertical cross-section taken along the line 4—4 of Figure 2;

Figure 5 is a perspective view of the core with the choke bean.

Referring now in detail to the several figures, the numeral 1 represents the block or body which is of conventional construction having threaded spuds 2 and 3 at its opposite ends adapting the block 1 to be intercalated in an oil line or other conduit represented by the reference character 4 in Figure 1, and preferably between two cut-off valves 5 and 6 so that when it is decided to change the choke bean the flow of fluid through the conduit may first be cut off.

The common expedient in changing the orifices in conduits for regulating or measuring the flow of fluid passing therethrough, is to disconnect the entire block or body. This is not only difficult, but also dangerous, in that even when the cut-off valves are closed, the fluid within the body is under the original pressure and will escape with great force when the parts are disconnected. Furthermore, the taking out of the body can only be done with great labor and the expenditure of considerable time.

Choke assemblies have been devised in which the body may remain in place and the flow bean taken out with a core, but such expedients have been complicated in nature and subject to such eventualities as the flow bean becoming displaced by back pressure for instance, and protruding into the passage through the block or body so that the core could not be removed. Other efforts in the direction of improving the operation of replacing a flow bean have involved the employment of a core or circular cross section which may be inadvertently placed in such an angular position as to partly occlude the orifice.

In the present invention, the block 1 is provided with an aperture therethrough intersecting the fluid passage 7, the elements of said aperture tapering in a downward direction. In other words, the aperture or core seat may be frusto-pyramidal or oval in cross section as illustrated in Figure 3, tapering toward the bottom or any other shape. Within the aperture or seat rests a core 8 of similar shape, the contacting surface of said core and seat being carefully machined so as to form a sealed joint. The core 8 is provided with a port 9 substantially coaxial with the passage 7 when the core is in position. On account of the non-round cross section of the shape of the core, it can only be inserted in the block in one of two directions 180° apart, either of which is correct, since it aligns the bore 9 with the passage 7. One end of the bore 9 is of enlarged diameter, as shown at 10 in Figure 2, the junction between the parts of larger and smaller diameter constituting an annular shoulder 11 forming a seat for the bean 12. Said bean makes a sliding fit with the part 10 of large diameter and the outer face 13 of said bean preferably merges with the contour of the adjacent surface of the core 8.

It will be observed in Figure 2 that the part 10 of relatively large diameter is larger in diameter than the passage 7, so that when the bean 12 is in place the edges of the bean extend beyond the edges of the passage 7 so that the bean 12 cannot slip out of position. This makes it possible at all times to remove the core 8 without difficulty.

The body or block 1 preferably has a flat under surface 14 and an abutment plate 15 rests against said surface preferably the core 8 terminates a little short of the plate 15 as shown. The lower end of the core 8 has a threaded extension 16 engaged by a nut 17 so that the core can be pulled down tight by screwing the nut against the plate 15.

Of course, the attempt to remove the core is never made until the cut-off valves 5 and 6 have been closed, and it is then preferred to open the needle plug 17 so as to permit the pressure on both sides of the flow bean to diminish down to atmospheric pressure before the choke device is opened. When the pressure has thus been reduced, the nut 17 is unscrewed, the stem 16 slightly tapered which will loosen the core, permitting it to be readily removed. The choke or bean can then be pushed out and one of a different desired size inserted in its place. The core is then replaced in the block 1 and the nut 17 screwed up on the stem 16. The cut-off valves 5 and 6 are then opened and the flow through the choke assembly is resumed.

While I have in the above description disclosed what I believe to be a preferred and practical embodiment of my invention, it will be understood to those skilled in the art that the details of construction as shown and described are merely by way of example and not to be construed as limiting the scope of the appended claims.

What I claim as my invention is:

1. Flow bean comprising a block adapted to be intercalated in a conduit having a passage therethrough constituting part of said conduit, a core sealingly seated in a seat in said block which intersects said passage, said core and seat being of non-round cross section, said core having a bore adapted when said core is seated to align substantially axially with said passage, one end of the bore of said core being enlarged, forming a shoulder at its base, a bean fitting the enlarged portion of the bore in the core, said bean having a port establishing restricted communication between opposite sides of said passage, said bean being of greater diameter than said passage so as to make it impossible for said bean to protrude into said passage and thus prevent withdrawal of said core.

2. Flow bean as claimed in claim 1, said core being non-round in cross section.

CECIL E. KIRK.